United States Patent
Hahn

(10) Patent No.: US 8,453,694 B2
(45) Date of Patent: Jun. 4, 2013

(54) PNEUMATIC TIRE HAVING AN INNERLINER OF A RUBBER COMPOSITION COMPRISED OF DIENE BASED ELASTOMER AND RESIN

(75) Inventor: Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 328 days.

(21) Appl. No.: 12/944,166

(22) Filed: Nov. 11, 2010

(65) Prior Publication Data

US 2012/0118468 A1    May 17, 2012

(51) Int. Cl.
*B60C 9/02* (2006.01)
(52) U.S. Cl.
USPC ........ 152/564; 152/151; 152/209.1; 152/450; 524/526
(58) Field of Classification Search
USPC ................ 152/564, 151, 209.1, 450; 524/526
See application file for complete search history.

(56) References Cited

U.S. PATENT DOCUMENTS

| | | | |
|---|---|---|---|
| 2009/0044892 A1* | 2/2009 | Lippello et al. | 152/450 |
| 2010/0132861 A1 | 6/2010 | Sandstrom et al. | 152/209.1 |

FOREIGN PATENT DOCUMENTS

| | | |
|---|---|---|
| EP | 2033812 | 3/2009 |
| EP | 2236316 | 10/2010 |

OTHER PUBLICATIONS

European Search Report completed Feb. 9, 2012.

* cited by examiner

*Primary Examiner* — Robert D. Harlan
(74) *Attorney, Agent, or Firm* — Henry C. Young, Jr.

(57) ABSTRACT

The present invention relates to a pneumatic rubber tire having an integral innerliner of a rubber composition comprised of a combination of cis 1,4-polyisoprene rubber and medium to high vinyl styrene/butadiene rubber together with compatible resin.

9 Claims, No Drawings

PNEUMATIC TIRE HAVING AN INNERLINER OF A RUBBER COMPOSITION COMPRISED OF DIENE BASED ELASTOMER AND RESIN

The present invention relates to a pneumatic rubber tire having an integral innerliner of a rubber composition comprised of a combination of cis 1,4-polyisoprene rubber and medium to high vinyl styrene/butadiene rubber together with compatible resin.

BACKGROUND OF THE INVENTION

Historically, the inner surface of a pneumatic tire is typically comprised of a layer of a rubber composition designed to prevent or retard the permeation of air into the carcass from the tire's inner air chamber. It is often referred to as an innerliner. Innerliners, or innerliner layers, have been used for many years in tubeless pneumatic vehicle tires to retard or prevent the escape of air, namely atmospheric air, used to inflate the tire, thereby maintaining tire pressure. Rubbers, such as butyl rubber and halogenated butyl rubber, often referred to as halobutyl rubber, as well as blends thereof, are often used for such tire innerliners which are relatively impermeable to air.

Historically, the tire innerliner itself is normally prepared by conventional calendering or milling techniques to form a strip of uncured rubber composition of appropriate width which is sometimes referred to as a gum strip. Typically, the gum strip is the first element of the tire applied to a tire building drum, over and around which the remainder of the tire is built. When the tire is cured, the innerliner becomes an integral, co-cured, part of the tire. Tire innerliners and their methods of preparation are well known to those having skill in such art.

Blends of natural rubber and emulsion polymerization styrene/butadiene rubber have sometimes been used to form tire innerliner layers in place of butyl rubber based innerliner layers to reduce the innerliner layer cost. However, typically, the resultant innerliner is less resistant to air permeation unless it is used as a thick layer.

In such rubber blends, it is envisioned that voids are present between the elastomer chains of the rubbers within the innerliner layer.

For this invention, it is desired to evaluate blends of cis 1,4-polyisoprene rubber, preferably natural rubber, and styrene/butadiene rubber together with a compatible resin where is envisioned that the resin may fill, or partially fill, such voids to aid in enhancing resistance to air permeability for an tire innerliner layer without the use of butyl rubber.

In the description of this invention, the term "phr" means parts by weight of an ingredient per 100 parts by weight of elastomer in a rubber composition unless otherwise indicated. The terms "rubber" and "elastomer" are used interchangeably unless otherwise indicated. The terms "cure" and "vulcanize" are used interchangeably unless otherwise indicated. The terms "rubber composition" and "rubber compound" are used interchangeably unless otherwise indicated.

SUMMARY AND PRACTICE OF THE INVENTION

In accordance with this invention a tire is provided having an innerliner rubber composition comprised of, parts by weight based upon 100 parts by weight of rubber (phr);

(A) 100 phr of elastomers comprised of:
(1) about 0 to about 100, alternately from about 60 to about 80, phr of cis 1,4-polyisoprene rubber, preferably natural cis 1,4-polyisoprene rubber, and
(2) about 0 to about 100, alternately from about 20 to about 40, phr of styrene/butadiene rubber (SBR). Such SBR may have, for example, a vinyl 1,2-content in its polybutadiene portion in a range of from about 10 to about 50 percent;
(B) about 5 to about 40, alternately from about 15 to about 30 or even 40, phr of resin comprised of at least one of p-octylphenol formaldehyde resin, p-tert-butylphenol acetylene resin, p-tert-amylphenol formaldehyde resin, rosin acid and rosin acid derivatives such as, for example, rosin acid esters, rosin acid oligomers and disproportionated rosin acid.

It is considered that said compatible resin is compatible with the cis 1,4-polyisoprene rubber, preferably natural cis 1,4-polyisoprene rubber/SBR blend in a sense of the resin being soluble with the rubber.

In practice, it is intended that such tire innerliner rubber is exclusive of butyl-type elastomers and brominated copolymers of alpha methylstyrene and isobutylene.

The term "butyl-type" rubber relates to elastomers comprised of, for example, isobutylene/diene copolymers such as butyl rubber, as well as chlorobutyl rubber, bromobutyl rubber and mixtures thereof.

Butyl rubber is conventionally described as a copolymer of isobutylene and isoprene wherein the copolymer contains from about 2 to about 6 weight percent units derived from isoprene (and thus from about 94 to about 99 weight percent units derived from isobutylene). A halobutyl rubber is a butyl rubber which has been halogenated, usually with bromine or chlorine. Thus such halobutyl rubber is typically either bromobutyl rubber or chlorobutyl rubber. Such butyl rubber and halobutyl rubber are well known to those having skill in such art.

A significant aspect of the invention is providing a blend of natural rubber and styrene/butadiene rubber (SBR) as compatible elastomers together with a compatible resin, namely a resin that is compatible with the natural rubber and the SBR, and the blend thereof in a sense of being soluble therein to enhance the ability of the blend to provide air permeation resistance, particularly for use as a pneumatic tire innerliner layer.

While the mechanism may not be fully understood, it is envisioned that the compatible resin at least partially occupies (at least partially fills) voids, or free volume, between the elastomer chains to enhance resistance to oxygen permeability of the rubber composition.

For the preparation of the innerliner rubber composition, various rubber compounding ingredients may be used, where appropriate and depending somewhat upon innerliner properties desired. Conventional reinforcing filler for the innerliner rubber composition is rubber reinforcing carbon black. Additional compounding ingredients typically include, where appropriate, antioxidants, antiozonants, stearic acid and zinc oxide. As known to those skilled in the art, depending on the intended use of the sulfur vulcanized rubber, certain additives mentioned above are commonly used in conventional amounts. Typical additions of carbon black may comprise, for example only and where appropriate, from about 10 to 100 parts by weight based on 100 parts by weight of rubber (phr), usually in a range of from about 40 to 60 phr. Typical amounts of antioxidant might, for example, comprise 1 to 5 phr. Typical amounts of stearic acid might comprise, for example, 0.50 to about 2 phr. Typical amounts of zinc oxide might comprise, for example, 1 to 5 phr. The presence and relative amounts of such additives are not considered to be a significant aspect of the present invention.

The vulcanization of the rubber composition for use as an innerliner is conducted in the presence of a sulfur vulcanizing agent. Examples of suitable sulfur vulcanizing agents include, for example, elemental sulfur (free sulfur) or sulfur donating vulcanizing agents, for example, an amine disulfide, polymeric disulfide or sulfur olefin adducts. Such sulfur vulcanizing agents might be used, for example, and where appropriate, in an amount which might range from about 0.2 to about 3 phr.

Sulfur cure accelerators are typically used to control the time and/or temperature required for vulcanization and to improve the properties of the vulcanizate. A single accelerator system may be used, i.e. a primary accelerator. In an alternative, combinations of 2 or more accelerators may be used which may be comprised of a primary accelerator and a secondary accelerator in order to activate and to improve the properties of the vulcanizate. In addition, delayed action accelerators might be used where appropriate. Various types of accelerators include, for example, various amines, disulfides, guanidines, thioureas, thiazoles, thiurams, sulfenamides, dithiocarbamate and xanthates. Usually a primary accelerator is, for example, a disulfide or sulfenamide.

In practice the rubber compound is formed into an unvulcanized gum strip, namely a rubber composition without (exclusive of) cord or fiber reinforcement. Such unvulcanized gum rubber strip may, for example, be produced by passing an unvulcanized rubber composition through a mill, calender, extruder or other suitable means. The uncured rubber gum strip is then constructed as an inner surface (exposed inside surface) of an uncured rubber tire assembly of components. The innerliner is then sulfur co-cured with the tire assembly during the tire curing operation under conditions of heat and pressure. The innerliner rubber gum strip may have a thickness, for example, in a range of about 0.04 to about 0.4 centimeters, depending somewhat upon the particular associated tire.

Vulcanization of the tire of the present invention is generally carried out at temperatures of, for example, ranging from about 130° C. and 160° C. Any of the usual vulcanization processes may be used such as heating the tire assembly in a press or mold, heating with superheated steam or hot salt or in a salt bath. Preferably, the heating is accomplished in a press or mold in a method known to those skilled in the art of tire curing.

As a result of this vulcanization, the innerliner rubber layer, or strip, becomes an integral part of the tire by being co-cured therewith. The innerliner may, for example, have an uncured gum rubber thickness in the range of from about 0.04 to 0.4 centimeters. For example, the innerliner layer may have an uncured gum thickness in the range of from about 0.08 to about 0.2 centimeters for passenger tires, although the innerliner can be considerably thicker for truck tire.

The pneumatic tire with the integral innerliner may be constructed in the form of a passenger tire, truck tire, or other type of bias or radial pneumatic tire.

The following examples are presented in order to illustrate but not limit the present invention. The parts and percentages are by weight unless otherwise noted.

EXAMPLE I

Preparation of Rubber Compositions as Natural Rubber and S-SBR

Rubber compositions composed of natural rubber and solution polymerization prepared styrene/butadiene copolymer rubber (S-SBR) were prepared with a compatible resin for evaluation for use as air, namely oxygen, permeation resistance.

Rubber compositions were prepared as rubber Samples A through D.

Control rubber Sample A was a bromobutyl rubber based rubber composition.

Comparative rubber Sample B was a rubber composition based upon a compatible blend of natural rubber and solution polymerization prepared butadiene/styrene rubber (S-SBR) having a relatively high vinyl content.

Experimental rubber Samples C, D and E were a rubber compositions based upon a compatible blend of natural rubber and (S-SBR) having a relatively high vinyl content together with several levels of a compatible resin as p-octylphenol formaldehyde resin.

Experimental rubber Samples F, G and H were a rubber compositions based upon a compatible blend of natural rubber and (S-SBR) having a relatively high vinyl content together with several levels of a compatible resin as t-butylphenol acetylene resin.

The general formulation for the rubber Samples is illustrated in the following Table 1 with the parts expressed in terms of weight unless otherwise indicated.

TABLE 1

|  | Control | Comparable | Experimental | | | | | |
|---|---|---|---|---|---|---|---|---|
|  | A | B | C | D | E | F | G | H |
| First Non-Productive Mixing (150° C.) | | | | | | | | |
| Bromobutyl rubber[1] | 90 | 0 | 0 | 0 | 0 | 0 | 0 | 0 |
| Butyl rubber[2] | 10 | 0 | 0 | 0 | 0 | 0 | 0 | 0 |
| Natural cis, 1,4-polyisoprene rubber[3] | 0 | 70 | 70 | 70 | 70 | 70 | 70 | 70 |
| Solution SBR rubber[4] | 0 | 30 | 30 | 30 | 30 | 30 | 30 | 30 |
| Carbon black[5] | 60 | 45 | 45 | 45 | 45 | 45 | 45 | 45 |
| Oil/processing aids | 15 | 25 | 5 | 0 | 0 | 5 | 0 | 0 |
| Tackifier[6] | 2 | 0 | 0 | 0 | 0 | 0 | 0 | 0 |
| Fatty acid[7] | 0.5 | 2 | 2 | 2 | 2 | 2 | 2 | 2 |
| Zinc Oxide | 1 | 3 | 3 | 3 | 3 | 3 | 3 | 3 |
| p-octylphenol formaldehyde resin[8] | 0 | 0 | 20 | 30 | 40 | 0 | 0 | 0 |
| p-tert-butylphenol acetylene resin[9] | 0 | 0 | 0 | 0 | 0 | 20 | 30 | 40 |

TABLE 1-continued

|  | Control | Comparable | Experimental | | | | | |
|---|---|---|---|---|---|---|---|---|
|  | A | B | C | D | E | F | G | H |
| Productive Mixing Step (100° C.) | | | | | | | | |
| Accelerator(s)[10] | 1.5 | 0.7 | 0.7 | 0.7 | 0.7 | 0.7 | 0.7 | 0.7 |
| Sulfur | 0.5 | 2.25 | 2.25 | 2.25 | 2.25 | 2.25 | 2.25 | 2.25 |

[1]Obtained as Bromobutyl 2222 from the ExxonMobil Corporation
[2]Obtained as Butyl 268 from the ExxonMobil Corporation
[3]Natural cis 1,4-polyisoprene rubber
[4]Solution polymerization prepared styrene/butadiene rubber (by copolymerizing styrene and 1,3-butadiene monomers in an organic solvent solution) as SLF1216 ™ from The Goodyear Tire & Rubber Company having a styrene content of about 16 percent and a vinyl 1,2-isomeric microstructure based upon the butadiene portion of the elastomer of about 42 percent.
[5]N660, an ASTM designation
[6]Hydrocarbon tackifier resin as CRJ418 ™ from the SI Group
[7]Fatty acid as combination comprised of stearic, palmitic and oleic acids
[8]p-octylphenol formaldehyde resin as SP1068 ™ from Schenectady
[9]p-tert-butylphenol acetylene resin as KORESIN ™ from Strucktol
[10]Sulfenamide and thuiram sulfur vulcanization accelerators The rubber compositions were prepared by mixing the respective ingredients as a two-step mixing process, namely by a first non-productive mixing step followed by a productive mixing step in which sulfur and accelerator(s) were added, all separate mixing steps in an internal rubber mixer. The first non-productive mixing stage was conducted for about 4 minutes to temperature of about 150° C. after which the mixture was dumped from the mixer and allowed to cool to less than about 40° C. The following productive mixing stage was conducted for about 2 minutes to a temperature of about 100° C. The Samples were cured in a suitable mold for about 30 minutes at a temperature of about 150° C. Various (cured and uncured) properties of the Samples are reported in the following Table 2.

It can further be seen from Table 2 that Comparative rubber Sample B, namely the natural rubber/SBR rubber blend, had a low oxygen permeation resistance of a gas transmission rate of 1012 $cm^3/cm^2$.

The task is then to evaluate whether an inclusion of a compatible resin in the natural rubber/SBR rubber blend can improve its resistance to oxygen permeation.

It can be seen from Table 2 that Experimental rubber Samples C, D and E, composed of the natural rubber/SBR rubber blend, which contained progressively increased amounts of 20, 30 and 40 phr of Resin A, namely the p-octylphenol formaldehyde resin, was discovered to have progressively improved resistances to oxygen permeation of gas

TABLE 2

|  | Control | Comparative | Experimental | | | | | |
|---|---|---|---|---|---|---|---|---|
|  | A | B | C | D | E | F | G | H |
| Resin Content (phr) | | | | | | | | |
| Butyl rubber without resin | 0 | — | — | — | — | — | — | — |
| NR & SSBR without resin | — | 0 | — | — | — | — | — | — |
| NR & SSBR with Resin A | — | — | 20 | 30 | 40 | — | — | — |
| NR & SSBR with Resin B | — | — | — | — | — | 20 | 30 | 40 |
| Gas transmission oxygen rate | | | | | | | | |
| (GTR)[1] $cm^3/m^2$ | 47 | 1012 | 420 | 292 | 285 | 442 | 298 | 173 |
| Rheometer (150° C.) | | | | | | | | |
| Maximum torque (dNm) | 5.66 | 8.98 | 7 | 5.68 | 4.07 | 8.07 | 7.11 | 6.05 |
| Minimum torque (dNm) | 1.79 | 1.44 | 1.64 | 1.38 | 1.22 | 1.6 | 1.53 | 1.4 |
| Delta torque (dNm) | 3.87 | 7.54 | 5.36 | 4.32 | 2.85 | 6.47 | 5.58 | 4.65 |
| T90 (min) | 17.32 | 20.65 | 30.23 | 35.46 | 43.13 | 20.34 | 24.1 | 26.63 |
| RPA | | | | | | | | |
| Uncured G', 15% strain, 0.83 Hz, 100° C. KPa | 97.8 | 74.7 | 90.4 | 91.8 | 82.9 | 69.4 | 88.2 | 86.1 |
| Cured G', 10% strain, 1 Hz, 100° C. KPa | 578.3 | 730.9 | 756.5 | 563.9 | 455.1 | 297.2 | 675.4 | 583.7 |
| Tan delta, 10% strain, 1 Hz, 100° C. | 0.262 | 0.053 | 0.042 | 0.096 | 0.124 | 0.199 | 0.068 | 0.074 |

[1]Gas Transmission Rate (GTR), ASTM method D1434-82

In Table 2, Resin A is p-octylphenol formaldehyde resin.
In Table 2, Resin B is p-tert-butylphenol acetylene resin.

It can be seen from Table 2 that the butyl rubber based Control rubber Sample A had excellent oxygen permeation resistance reported as a gas transmission rate (GTR) of 47 $cm^3/m^2$.

transmission rates of 420, 393 and 285 $cm^3/cm^2$, respectively, as the level of p-octylphenol formaldehyde resin in the rubber composition increased, all of which were a significant improvement over the oxygen transmission rate of 1012 $cm^3/cm^2$ for comparative natural rubber/SBR rubber containing rubber Sample B without the resin inclusion.

It can further be seen from Table 2 that Experimental rubber Samples F, G and H, composed of the natural rubber/SBR rubber blend, which contained progressively increased amounts of 20, 30 and 40 phr of Resin B, namely the p-tert-butylphenol acetylene resin, was discovered to have progressively improved resistances to oxygen permeation of gas transmission rates of 422, 298 and 173 $cm^3/cm^2$, respectively, as the level of octyl-phenol formaldehyde resin in the rubber composition increased, all of which were a significant improvement over the oxygen transmission rate of 1012 $cm^3/cm^2$ for comparative natural rubber/SBR rubber containing rubber Sample B without the resin inclusion.

Accordingly, it is concluded that the addition of the compatible resin to the natural rubber/SBR rubber blend has a significant impact upon its resistance to oxygen permeation as demonstrated by the significantly lower oxygen Gas Transmission Rates (GTR's). This is considered indicative that the compatible resin inclusions are at least partially filling the voids, of free volumes, between the polymer chains in the rubber composition.

EXAMPLE II

Preparation of Rubber Compositions as Natural Rubber and E-SBR

Rubber compositions composed of natural rubber and aqueous emulsion polymerization prepared styrene/butadiene copolymer rubber (E-SBR), instead of the natural rubber/solution SBR (SBR) used in Example I, were prepared with a compatible resin for evaluation for use for oxygen permeation resistance.

Rubber compositions were prepared as rubber Samples I through O.

Control rubber Sample I was an emulsion polymerization prepared styrene/butadiene rubber (E-SBR) containing rubber composition.

Experimental rubber Samples J through O were rubber compositions based upon Control rubber Sample I with an inclusion of increasing amounts of p-octylphenol formaldehyde resin ranging from 5 to 30 phr.

The general formulation for the rubber Samples is illustrated in the following Table 3 with the parts expressed in terms of weight unless otherwise indicated.

TABLE 3

|  | Control | Experimental | | | | | |
|---|---|---|---|---|---|---|---|
|  | I | J | K | L | M | N | O |
| First Non-Productive Mixing (150° C.) | | | | | | | |
| Emulsion SBR rubber[1] | 100 | 100 | 100 | 100 | 100 | 100 | 100 |
| Carbon black[2] | 60 | 45 | 45 | 45 | 45 | 45 | 45 |
| Oil/processing aids | 15 | 26.3 | 21.3 | 1635 | 11.3 | 6.3 | 1.3 |
| Tackifier[3] | 2 | 0 | 0 | 0 | 0 | 0 | 0 |
| Fatty acid[4] | 0.5 | 1 | 1 | 1 | 1 | 1 | 1 |
| Zinc oxide | 1 | 3 | 3 | 3 | 3 | 3 | 3 |
| Octyl-phenol formaldehyde resin[5] | 0 | 5 | 10 | 15 | 20 | 25 | 30 |
| Productive Mixing Step (100° C.) | | | | | | | |
| Accelerator(s)[6] | 1.0 | 1.1 | 1.2 | 1.3 | 1.4 | 1.5 | 1.6 |
| Sulfur | 2.3 | 23 | 2.3 | 2.3 | 2.3 | 2.3 | 2.3 |

[1]Aqueous emulsion polymerization prepared styrene/butadiene rubber (by copolymerizing styrene and 1,3-butadiene monomers in a water emulsion) as Plioflex 1502 ™ from the Goodyear Tire & Rubber Company having a styrene content of about 23 percent and a vinyl 1,2-isomeric microstructure based upon the butadiene portion of the elastomer of about 15 percent.
[2]N660, an ASTM designation
[3]Tackifier resin as CRJ418 ™ from the SI Group
[4]Fatty acids as combination comprised of stearic, palmitic and oleic acids
[5]p-octylphenol formaldehyde resin as SP1068 ™ from Schenectady
[6]Sulfur vulcanization sulfenamide and thiuram accelerators The rubber compositions were prepared by mixing the respective ingredients as a two-step mixing process, namely by a first non-productive mixing step followed by a productive mixing step in which sulfur and accelerator(s) were added, all separate mixing steps in an internal rubber mixer.

The first non-productive mixing stage was conducted for about 4 minutes to temperature of about 150° C. after which the mixture was dumped from the mixer and allowed to cool to less than about 40° C. The following productive mixing stage was conducted for about 2 minutes to a temperature of about 100° C. The Samples were cured in a suitable mold for about 30 minutes at a temperature of about 150° C.

Various (cured and uncured) properties of the Samples are reported in the following Table 4.

TABLE 4

|  | Control I | Experimental J | K | L | M | N | O |
|---|---|---|---|---|---|---|---|
| Resin Content (phr) | | | | | | | |
| E-SBR without Resin B | 0 | — | — | — | — | — | — |
| E-SBR with Resin B | 0 | 5 | 10 | 15 | 20 | 25 | 30 |
| Gas transmission oxygen rate | | | | | | | |
| (GTR)[1] $cm^3/m^2$ | 682 | 611 | 360 | 306 | 296 | 179 | 296 |
| Rheometer (150° C.) | | | | | | | |
| Maximum torque (dNm) | 9.67 | 9.5 | 9.18 | 9.35 | 9.07 | 8.1 | 6.87 |
| Minimum torque (dNm) | 0.082 | 0.81 | 0.79 | 0.82 | 0.85 | 0.83 | 0.78 |
| Delta torque (dNm) | 8.85 | 8.69 | 8.39 | 8.53 | 8.22 | 7.27 | 6.09 |
| T90 (minutes) | 31.93 | 30.34 | 30.45 | 31.81 | 34.33 | 39.26 | 39.12 |
| RPA | | | | | | | |
| Uncured G', 15% strain, 0.83 Hz, 100° C. kPa | 86.5 | 87.2 | 90.4 | 94.3 | 101.1 | 107.5 | 106.4 |
| Cured G', 10% strain, 1 Hz, 100° C. kPa | 697.8 | 686.6 | 700 | 684.5 | 665.3 | 609.8 | 542.6 |
| Tan delta, 10% strain, 1 Hz, 100° C. | 0.07 | 0.08 | 0.08 | 0.09 | 0.1 | 0.12 | 0.15 |

[1]Gas (oxygen) transmission rate (GTR); ASTM method 1434-82

In Table 4, Resin B is p-octylphenol formaldehyde resin.

It can be seen from Table 4 that the Control rubber Sample I, with the E-SBR without the resin inclusion, was observed to have a fairly high oxygen Gas Transmission Rate (GTR) of 682 $cm^3/m^2$.

It can further be seen from Table 4 that the addition of 5 phr of the octyl-phenol formaldehyde resin has an effect of lowering the oxygen GTR to 611 $cm^3/m^2$.

It is further seen that as the p-octylphenol formaldehyde resin content increases to values of 10, 15, 20, and 25 phr, the oxygen GTR further decreased to values of 360, 306, 296 and 179 $cm^3/m^2$, respectively, all of which are significantly lower than the oxygen GTR value of 682 $cm^3/m^2$ for the Control rubber Sample I without the resin inclusion.

For some reason it is observed that increasing the octyl-phenol formaldehyde resin content to 30 phr lowered the oxygen GTR to a value of 296 $cm^3/m^2$ which is still significantly lower than the oxygen GTR value of 682 $cm^3/m^2$ for the Control rubber Sample I.

Accordingly, it is concluded herein that the compatible resin, namely the p-octylphenol formaldehyde resin, is apparently acting to fill the voids, or open spaces, between the polymer chains of the E-SBR based rubber composition to lower the oxygen permeation (oxygen GTR) of the rubber composition, and in general, the more octyl-phenol formaldehyde resin added the lower the oxygen GTR indicating that more voids, or open spaces, are filled in the rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A tire having an innerliner of a rubber composition exclusive of butyl rubber and halogenated butyl rubber and are comprised of, based upon parts by weight per 100 parts by weight of rubber (phr);
   (A) 100 phr of elastomers comprised of:
      (1) about 0 to about 100 phr of cis 1,4-polyisoprene rubber, and
      (2) about 0 to about 100 phr of styrene/butadiene rubber (SBR);
   (B) from 15 to about 40 phr of resin composed of at least one of p-octylphenol formaldehyde resin, p-tert-butylphenol acetylene resin and p-tert-amylphenol formaldehyde resin.

2. The tire of claim 1 wherein said cis 1,4-polyisoprene rubber is natural cis 1,4-polyisoprene rubber.

3. The tire of claim 1 wherein said elastomers are comprised of;
   (A) about 60 to about 80 phr of natural cis 1,4-polyisoprene rubber, and
   (B) about 20 to about 40 phr of said styrene/butadiene (SBR) rubber.

4. The tire of claim 1 wherein said resin is p-octylphenol formaldehyde resin.

5. The tire of claim 3 wherein said resin is p-octylphenol formaldehyde resin.

6. The tire of claim 1 wherein said resin is p tert-butylphenol acetylene resin.

7. The tire of claim 3 wherein said resin is p tert-butylphenol acetylene resin.

8. The tire of claim 1 wherein said resin is p tert-amyl phenol formaldehyde resin.

9. The tire of claim 3 wherein said resin is p tert-amyl phenol formaldehyde resin.

* * * * *